United States Patent [19]
Whisnant

[11] Patent Number: 4,611,645
[45] Date of Patent: Sep. 16, 1986

[54] CREEL APPARATUS FOR ELECTRICAL WIRE

[76] Inventor: Daniel H. Whisnant, 906 Mable St., Mableton, Ga. 30059

[21] Appl. No.: 725,911

[22] Filed: Apr. 22, 1985

[51] Int. Cl.$^4$ ............... B65H 49/38; B65H 49/00; B65H 49/16
[52] U.S. Cl. .................... 242/129.5; 242/129; 242/134; 242/86.5 R; 280/47.19
[58] Field of Search .............. 242/86.5, 85, 85.1, 242/129, 129.5, 1, 129.8, 134, 130, 136, 137.1, 139, 141; 254/134.3 R; 280/34 B, 35, 41 C, 47.17, 47.19, 47.34

[56] References Cited

U.S. PATENT DOCUMENTS

| | | | |
|---|---|---|---|
| 327,478 | 9/1885 | Spalding | 254/134.3 R |
| 3,383,071 | 5/1968 | Godson | 242/85 X |
| 3,826,513 | 7/1974 | Wolf | 280/79.1 A |
| 3,831,877 | 8/1974 | Bennett et al. | 242/86.5 R |
| 4,391,422 | 7/1983 | McDonald | 242/129.5 |
| 4,457,527 | 7/1984 | Lowery | 280/47.19 |
| 4,564,152 | 1/1986 | Herriage | 280/47.19 |

*Primary Examiner*—Donald Watkins
*Attorney, Agent, or Firm*—James B. Middleton

[57] ABSTRACT

A creel for reels of electrical wire. A creel member has spindles extending out to receive reels of electrical wire, and a support leg is pivoted at the upper end of the creel member and movable out to provide a tripod arrangement. A chain extends from the support leg to the creel member to limit the movement. The spindles are perpendicular to the stanchions of the creel member so flanges of the reels will lie along the stanchions. Guides, or eyes, are fixed to the support leg so wires from the reels are gathered for control. The support leg has a roller mounted at its end so the creel and support leg can be pivoted to lie together, the apparatus slanted back with the creel member above the support leg, and the roller will engage the floor to facilitate transport.

8 Claims, 3 Drawing Figures

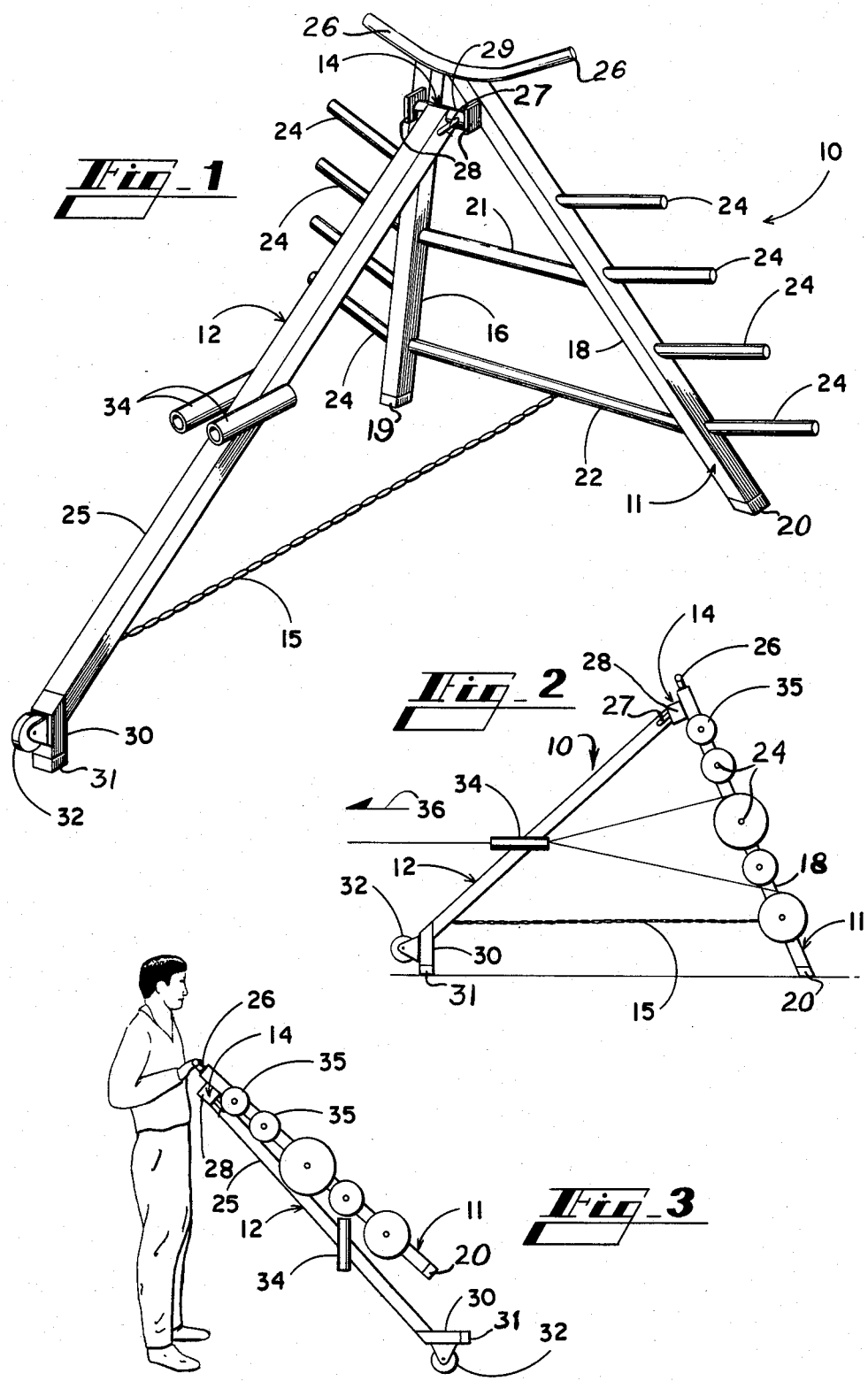

CREEL APPARATUS FOR ELECTRICAL WIRE

INFORMATION DISCLOSURE STATEMENT

When an electrician is wiring a building or the like, it is common for tubing, or conduit, to be placed into the walls of the structure, and wire subsequently to be drawn through the conduit. When pulling wire in this fashion, the common procedure is to place a plurality of reels of wire side by side on a pipe or the like, and to support the pipe between two ladders or other support means.

It will be understood that a reel of wire is generally copper wire, and a plurality of reels may be quite heavy. Thus, care must be taken in supporting the reel, and in pulling wire from the reels since this force, in conjunction with the weight of the wire, may cause the supporting structure to tip over.

Additionally, it will be understood that the electrician must move from room to room, pulling the wire for various receptacles, switches and the like. To move this quantity of wire, generally either two people are required, or one person must make two or more trips; and, after the wire has been moved, the supports must again be put into place to allow the reels of wire to rotate freely as the wire is withdrawn from the reels.

SUMMARY OF THE INVENTION

This invention relates generally to a creel for supporting a plurality of reels of electrical wire, and is more particularly concerned with a creel arranged both for support while pulling wire and for transport between various work areas.

The present invention provides a creel member having a plurality of spindles extending therefrom for receiving reels of wire, and a pivoted support for holding the creel member in position for use. The support further carries at least one eye for guiding strands pulled from the reels. The support is longer than the creel member so that, when the support is pivoted to lie against the creel member, the support extends therebeyond. A roller on the support allows easy transport between work areas.

BRIEF DESCRIPTION OF THE DRAWINGS

These and other features and advantages of the present invention will become apparent from consideration of the following specification when taken in conjunction with the accompanying drawings in which:

FIG. 1 is a perspective view of a creel made in accordance with the present invention, the apparatus being shown with the support extended from the creel;

FIG. 2 is a side elevational view of the apparatus shown in FIG. 1, and illustrating reels of wire thereon; and, FIG. 3 is a side elevational view of the apparatus showing the support member folded for transport of the apparatus.

DETAILED DESCRIPTION OF THE EMBODIMENT

Referring now more particularly to the drawings, and to that embodiment of the invention here presented by way of illustration, the creel apparatus is generally designated at 10, and includes a creel member 11 and a support member 12. The support member 12 is pivotally connected to the creel member 11 as at 14, and a chain 15 limits the outward motion of the support member 12 with respect to the creel member 11.

It will be seen that the creel member 11 includes two stanchions 16 and 18 which are convergent towards the upper ends thereof the lower ends being widely spaced and provided with nonskid tips 19 and 20.

A plurality of transverse supports 21 and 22 extend between the two stanchions 16 and 18 to render the creel member 11 rigid in its form.

The creel member 11 includes a plurality of spindles extending therefrom, the spindles being designated at 24. As here shown, the stanchions 16 and 18 are formed of square tubing, and both the transverse supports 21 and 22 and the spindles 24 are fixed, as by welding, to the flat face of the stanchions. The uppermost spindles are designated at 26, and these spindles are formed by bending a single piece of tubing and welding the central portion to the upper ends of the stanchions 16 and 18. This is a convenient arrangement, and provides further connection of the stanchions.

It should be noted that the spindles 24 and 26 will be generally perpendicular to the stanchions 16 and 18. This is desired because the spindle will extend through a reel of wire so the side flanges on the spool will lie parallel to the stanchions 16 or 18. It will of course be understood that a washer or other spacer can be used to hold the reel slightly outwardly of the stanchions 16 or 18 for easier rotation of the spool.

Looking now at the support member 12 in more detail, it will be seen that the support member 12 is formed of a piece of square tubing 25. Adjacent to the pivot 14, the tubing 25 is welded to a sleeve 29, the sleeve 29 surrounding a pintle (not shown). The pintle is fixed between a pair of ears 28, each ear 28 being fixed to one of the stanchions 16 and 18. Additional support rods 27 extend from the tubing 25 to the sleeve 29 for better lateral strength. It will therefore be understood that the support member 12 will be readily pivotal with respect to the creel member 11.

To remove the possibility of lateral motion of the sleeve 29 with respect to the pintle, one may use a threaded shaft for the pintle. Nuts having mating threads can then be welded to the sleeve so that rotation of the sleeve rotates the nuts on the threaded shaft. This arrangement allows the use of off-the-shelf parts and produces a sturdy pivot.

While the square tubing 25 will render the support member 12 quite rigid, it will of course be understood by those skilled in the art that other structural shapes and arrangements may be utlized to achieve the same strength.

At the lower end of the support member 12, an additional piece of square tubing or the like is fixed to the member 25 to provide a foot 30 which receives a nonskid tip 31. The foot 30 extends generally vertically, and mounts a caster 32. The caster 32 will be discussed in more detail hereinafter.

Generally centrally of the support member 12, there is a pair of eyes 34. The eyes 34 are adapted to receive strands from reels of wire placed on the spindles 24 and 26 so the strands will be easy to control as a plurality of strands is drawn through a single conduit.

The eyes 34 may be very conveniently formed by welding a pipe sleeve or the like to the tubular member 25 and, conventional plastic or ceramic bushings may be threaded into the pipe sleeves to provide a smooth drawing surfaces for the wires. Obviously, other mechanical expedients may be utilized to provide the eyes 34.

Looking now at FIG. 2 of the drawings, it will be observed that the apparatus 10 of the present invention is shown set up for pulling wire. A plurality of reels of wire designated at 35 are shown received on the spindles 24, and the strands are pulled from the reels 35, passing through the eyes 34, and extending outwardly. Since the wire will be pulled in the direction indicated by the arrow 36, it will be understood that this force is well counteracted by the angular relation of the support member 12 with respect to the creel member 11. While the angle of the support member 12 with respect to the floor or other supporting surface may vary quite widely, it has been found that an angle in the vicinity of 30 to 45 degrees is admirably suited to this arrangement.

It is desirable to have the creel member 11 at an angle approaching 90° with respect to the support surface, though always less than 90°. This will provide maximum spacing between reels, and cause the creel member 11 to lean towards the support member 12 and provide a stable apparatus 10. It has been found in practice that an angle of the creel member 11 with respect to the support surface may be in the vicinity of 60° to 75°, though this is clearly variable depending on the particular design selected.

Looking now at FIG. 3 of the drawings, it will be seen that the apparatus of the present invention is easily transportable from one location to another, without removing the reels of wire 35. With the apparatus fully operative as shown in FIG. 2 of the drawings, one can lift the creel member 11 and allow the support member 12 to pivot towards the creel member 11 until the two members are generally parallel. The device can then be slanted so that the caster 32 engages the floor while the creel member 11 is urged against the support member 12 by gravity. In this position, the two uppermost spindles 26 can be grasped, and the entire assembly can be rolled in wheelbarrow fashion for easy transport.

It will be understood that, for the usual transport, the caster 32 may be any desired type of wheel or other roller means. Nevertheless, when it is considered that the apparatus will frequently have to pass through relatively narrow doorways and the like, it will be understood that the use of a caster will allow the apparatus to be pushed sideways or in any other direction required for passing through narrow passageways.

As here illustrated, it will be seen that the structural support of the apparatus is made of square tubing, but it will be understood that other structural shapes can be utilized, and virtually any material having necessary strength can be utilized. Also, if small reels of thin wire are to be used with the device, the apparatus can be small and light in weight and if large reels of heavy gauge wire are to be used, the structure must be stronger to support the additional weight.

It will therefore be understood by those skilled in the art that the particular embodiment of the invention here presented is by way of illustration only, and is meant to be in no way restrictive; therefore, numerous changes and modifications may be made, and the full use of equivalents resorted to without departing from the spirit or scope of the invention as defined in the appended claims.

I claim:

1. A creel apparatus, for reels of electrical wire or the like, said creel apparatus comprising a creel member and a support member pviotal with respect to said creel member, said creel member including stanchions for supporting said creel member, and a plurality of spindles extending from said creel member, said support member including limiting means for limiting the outward pivotal motion of said support means with respect to said creel member, the arrangement being such that said creel apparatus is supported on said stanchions and said support member, said support member further including strand guide means for collecting strands from said plurality of spindles.

2. A creel apparatus as claimed in claim 1, said support member being pivotal to selectively lie generally against said creel member, and further including roller means carried by said support member, said support member including a foot for supporting said creel apparatus, said roller means being carried by said foot for transporting said creel apparatus with said creel member lying against said support member.

3. A creel apparatus as claimed in claim 2, said creel member including transverse members for connecting said stanchions, said stanchions converging towards their upper ends, said spindles extending from said stanchions generally perpendicularly thereto.

4. A creel apparatus as claimed in claim 3, said creel member further including hinge means for pivotally fixing said support member to said creel member.

5. A creel apparatus as claimed in claim 1, said creel member and said support member having such dimensions that said creel member will form an angle of less than 90° to the support surface, and said support member will extend from the upper end of said creel member, outwardly to form an acute angle to said support surface, said limiting means extending between said support member and said creel member to prevent further movement of said support member.

6. A creel apparatus as claimed in claim 2, said roller means comprising a caster for allowing said creel apparatus to roll in any selected direction with respect to said creel member.

7. A creel apparatus as claimed in claim 5, said strand guide means including an eye for receiving strands from said reels therethrough, said eye being fixed to said support member so forces pulling strands from said reels will be in a direction from said creel member towards said support member.

8. A creel apparatus as claimed in claim 7, said eye comprising a cylinder, said cylinder being so oriented with respect to said support member that the centerline of said cylinder is horizontal when said creel apparatus is arranged with said support member holding said creel member in place on a supporting surface.

* * * * *